M. HAMLIN.
BOLT THREADING MACHINE.

No. 105,569.  Patented July 19, 1870.

Witnesses:

Inventor
Mahlon Hamlin
per
Alexander Mason
Atty.

United States Patent Office.

MAHLON HAMLIN, OF CATAWISSA, ASSIGNOR TO HIMSELF AND BENJAMIN G. WELCH, OF DANVILLE, PENNSYLVANIA.

Letters Patent No. 105,569, dated July 19, 1870.

IMPROVED BOLT-THREADING MACHINE.

The Schedule referred to in these Letters Patent and making part of the same

*To all whom it may concern:*

Be it known that I, MAHLON HAMLIN, of Catawissa, in the county of Columbia and in the State of Pennsylvania, have invented certain new and useful Improvements in Bolt-threading Machine; and do hereby declare that the following is a full, clear, and exact description thereof, reference being had to the accompanying drawing and to the letters of reference marked thereon, making a part of this specification.

My present invention is intended as an improvement in bolt-threading machines, for which Letters Patent have been allowed to me; and It consists in the combination of devices, hereinafter set forth and claimed.

In order to enable others skilled in the art to which my invention appertains to make and use the same, I will now proceed to describe its construction and operation, referring to the annexed drawing, in which—

Figure 1:
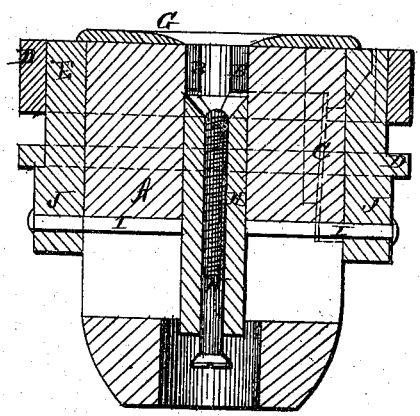
Figure 2:
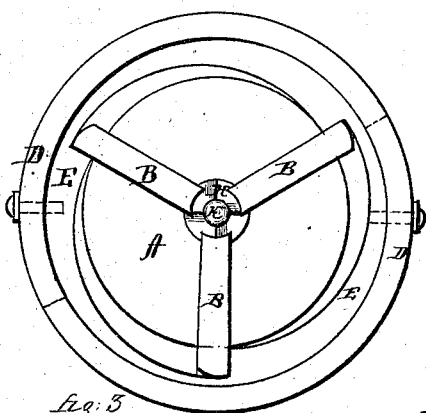
Figure 3:
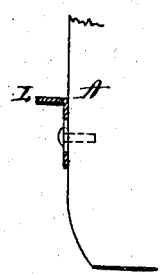

Figure 1 is a longitudinal vertical section, and
Figure 2 is a front end view of my machine.
Figure 3 shows the side of the head of the bolt-cutter.

A represents the die-head;
B B, the dies;
C C, the springs;
D, the sleeve;
E, the compensating-ring; and
G, the face-plate; all constructed and operating in the same manner as described in the application above referred to, with the exception that the upper ends of the springs C C are not inserted in notches on the under sides of the dies, but bear against a shoulder formed thereon, as shown in dotted lines in fig. 1.

In the die-head A is inserted a tool, H, which, on its front end, is formed as a female rose-bit, for cutting the end of the bolt in the desired shape.

This tool is, by bolts I I, or other suitable means, connected with ears J J, formed upon the rear edge of the sleeve D, the bolts passing through slots in the die-head A.

The bit H can be adjusted at will, by means of its connection with the ears J J, so as to make the bolt of any desired length.

Through the center of this tool is passed a screw, K, the end of which projects in the center of the rose-bit.

The dies being closed, and cutting the thread on the bolt in the usual manner, the inner end of the bolt soon enters the rose-bit H, and is cut or beveled, when the end of the bolt then strikes the end of the screw K, it moves the tool H back within the head, carrying the sleeve D with it, which opens the dies and releases the bolt.

By adjusting the screw K so as to have the end thereof more or less projecting through the center of the rose-bit, the end of the bolt will be cut more or less, as may be desired.

When the sleeve D moves back upon the head A, it strikes an adjustable stop, L, fastened by a single screw on the side of the head, as shown in fig. 3.

By loosening this screw so that the stop L can be turned, the sleeve D may be moved sufficiently back to allow the removal of the dies B B.

In my former application, the face-plate G had to be removed when it was desired to take out the dies, but in this case it is only necessary to loosen the screw that holds the stop L, which, of course, can be done much quicker.

If the springs C C were inserted in notches on the under sides of the dies, the dies could not be removed in this manner, and hence I have merely provided a shoulder on the under sides of the dies, against which the springs bear to throw the dies outward.

Having thus fully described my invention,

What I claim as new, and desire to secure by Letters Patent, is—

1. The tool or rose-bit H, provided with the screw K, and connected with the movable sleeve D, substantially for the purposes herein set forth.

2. The combination of the die-head A, sleeve D, and suitable mechanism for reciprocating said sleeve and the adjustable stop L, as and for the purpose set forth.

In testimony that I claim the foregoing, I have hereunto set my hand this 8th day of June, 1870.

MAHLON HAMLIN.

Witnesses:
A. N. MARR,
A. A. YEATMAN.